United States Patent [19]

Kline

[11] Patent Number: 4,519,209
[45] Date of Patent: May 28, 1985

[54] HYDRAULIC MOTOR BYPASS APPARATUS

[75] Inventor: Charles M. Kline, Reinholds, Pa.

[73] Assignee: Sperry Corporation, New Holland, Pa.

[21] Appl. No.: 434,809

[22] Filed: Oct. 18, 1982

Related U.S. Application Data

[62] Division of Ser. No. 177,147, Aug. 11, 1980, Pat. No. 4,384,455.

[51] Int. Cl.³ .............................................. F16D 31/02
[52] U.S. Cl. ......................................... 60/433; 60/468; 91/35; 91/437; 119/52 AF; 192/33 R; 192/103 R; 251/309; 464/48
[58] Field of Search .................... 91/35, 437, 450, 458, 91/470; 192/33 R, 103 R; 464/48; 251/309; 60/433, 468, 466, 450, 451, 460; 119/51 R, 52 AF

[56] References Cited

U.S. PATENT DOCUMENTS

| | | | |
|---|---|---|---|
| 2,421,925 | 6/1947 | Cooley | 464/48 |
| 2,540,997 | 2/1951 | Schmitter | 464/48 |
| 2,623,618 | 12/1952 | Howard | 464/48 |
| 2,923,973 | 2/1960 | Ninneman | 91/450 |
| 2,940,283 | 6/1960 | Christenson | 464/48 |
| 3,001,623 | 9/1961 | Fawick | 464/48 |
| 3,283,862 | 11/1966 | Warnock | 192/33 R |
| 3,405,601 | 10/1968 | Clarke | 91/470 |
| 3,522,820 | 8/1970 | Watts | 251/309 |
| 4,113,228 | 9/1978 | Frye | 251/309 |
| 4,186,707 | 2/1980 | Driggers | 251/309 |

Primary Examiner—Abraham Hershkovitz
Attorney, Agent, or Firm—Darrell F. Marquette; Frank A. Seemar; Larry W. Miller

[57] ABSTRACT

Grinder-mixers include a material infeed device such as a feed table for feeding bales of hay to be ground up and incorporated into livestock feed rations. Due to varying bale density, the bale grinder sometimes lugs down when encountering a dense bale. However, if the feed table continues to feed bales during such a lug down, the grinder may clog and stall. A bypass apparatus solves the feed table problem by providing a bypass valve automatically operable to stop motion of the feed table when a lug down occurs.

7 Claims, 6 Drawing Figures

HYDRAULIC MOTOR BYPASS APPARATUS

This is a division of application Ser. No. 177,147 filed 8-11-80 now U.S. Pat. No. 4,384,455.

BACKGROUND OF THE INVENTION

This invention relates generally to solid material comminution apparatus and more particularly to those having automatic control of comminutor drive.

Apparatus, such as a grinder-mixer, is used to mix livestock feed rations. One of the major ingredients in such feed is hay. The hay is fed to a grinder on a material infeed device commonly known as a feed table. The feed table and the grinder ultimately derive power from a common prime power source usually supplied by an agricultural tractor connected to the grinder-mixer via a power takeoff (PTO) shaft. An associated power source usually operates off the prime source for supplying motive power to the feed table. This associated power may be termed either mechanical or hydraulic.

Mechanical feed table drive is limited to having a fixed speed which must be manually adjusted to cope with varying bale density. For example, an unusually dense or wet bale can cause an overload on the grinder causing the prime power source to lug down and sometimes stall. If the feed table speed is not slowed or stopped, the lug down becomes more severe. Manual speed adjustment requires operator attention and since the operator is busy supplying bales to the feed table, he cannot always manually adjust feed table speed in time to avoid a stall.

In hydraulic systems, motive power is supplied to the feed table by a hydraulically operated motor. A push-pull type valve has been used to be automatically actuated to cut-off feed table motive power when a lug down occurs. However, this push-pull type valve has the limitations of being expensive and complicated.

The foregoing illustrates limitations of the known prior art. Thus, it is apparent that it would be advantageous to provide an alternative directed to overcoming one or more of the limitations as set forth above.

SUMMARY OF THE INVENTION

In one aspect of the present invention, this is accomplished by providing a hydraulic motor bypass apparatus including a power source connected to a fluid circuit. The circuit includes a reservoir, a fluid operated motor, means for pumping fluid from the reservoir to the motor, a speed control valve and a motor bypass valve connected to the circuit.

The feed table derives motive power from the fluid motor. A drive member is rotatably actuated and deactuated by a centrifugal clutch. A shaft extends through the bypass valve and a driven member is connected to be rotatably driven on the shaft by the drive member. The driven member is connected for rotating the shaft to a position for blocking fluid flow through the valve. Means are resiliently connected for rotating the shaft to a position for opening fluid flow through the valve for bypassing the motor.

The foregoing and other aspects will become apparent from the following detailed description of the invention when considered in conjunction with the accompanying drawings. It is to be expressly understood, however, that the drawings are not intended as a definition of the invention but are for the purpose of illustration only.

DESCRIPTION OF THE PREFERRED EMBODIMENT

Figure 1:
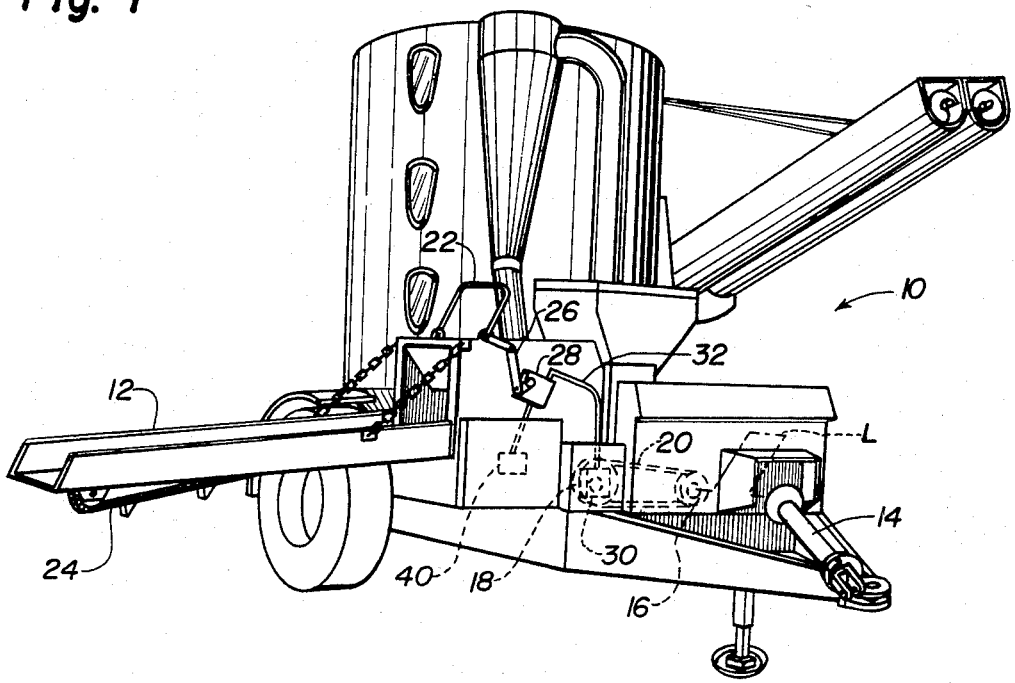
FIG. 1 is an isometric view illustrating a grinder-mixer using the apparatus of this invention.

Referring now to the drawings, a grinder-mixer is generally designated 10 in FIG. 1. Grinder-mixer 10 includes a known feed table 12. Power is supplied to mixer 10 by a power source such as a PTO shaft 14 connected to an agricultural tractor (not shown in FIG. 1) in the conventional manner. Through conventional linkages L power is transmitted from PTO shaft 14 to a driver sheave 16 which drives a driven sheave 18 via a belt drive 20. A manually operated lever 22 for starting and stopping a feed chain 24 of feed table 12 is connected through appropriate linkage 26 to a hydraulically operated speed control valve 28, such as the Model No. FC-51-½ manufactured by Brand Hydraulics. Speed control valve 28 is operably connected to a bypass valve 30 in accordance with this invention, through appropriate conduits 32, part of which is shown in FIG. 1.

Figure 2:
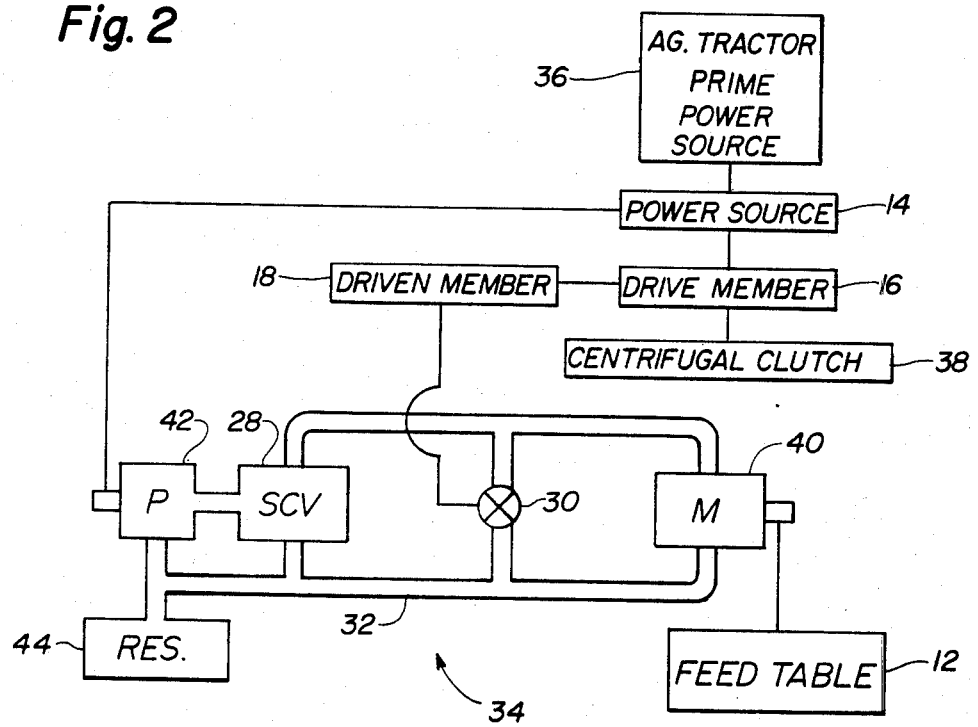
FIG. 2 is a view of a fluid circuit as used with the apparatus of this invention.

A circuit is illustrated in FIG. 2 for describing the combined use of a power source such as PTO shaft 14 and a fluid circuit designated 34, for automatically controlling feed table 12. As stated before, prime power is supplied by an agricultural tractor 36 in the conventional manner. A PTO shaft 14 transfers prime power to grinder-mixer 10 and through conventional linkages to a drive sheave 16 which drives driven sheave 18 via belt drive 20. Driven member 18 is connected to actuate bypass valve 30 as described later in greater detail. A clutch 38 will cause drive member 16 to rotate when rotational drive is freely supplied by PTO shaft 14. However, when overload conditions on other components of grinder-mixers 10, such as the bale grinder (not shown), cause PTO shaft 14 to lug down, clutch 38 may deactuate rotation of drive member 16 thus stopping rotation of driven member 18. As will be more fully described hereinafter, rotation of driven member 18 operates to close bypass valve 30 permitting a fluid operated motor 40, such as Model No. 101-1003-007 manufactured by the Charlynn Division of Eaton, to supply motive power to feed table drive chain 24 whereas when driven member 18 stops rotating, bypass valve 30 opens permitting fluid to pass through valve 30 bypassing motor 40 thus stopping drive chain 24. The speed of motor 40 is metered by speed control valve 28. A pump 42 and a fluid reservoir 44 may be on the associated tractor as a part of the tractor hydraulic system and fluid may be supplied to circuit 34 via high pressure hoses as is well known. Alternatively, all or part of the fluid circuit 34 could be self-contained on the grinder-mixer 10.

Figure 3:
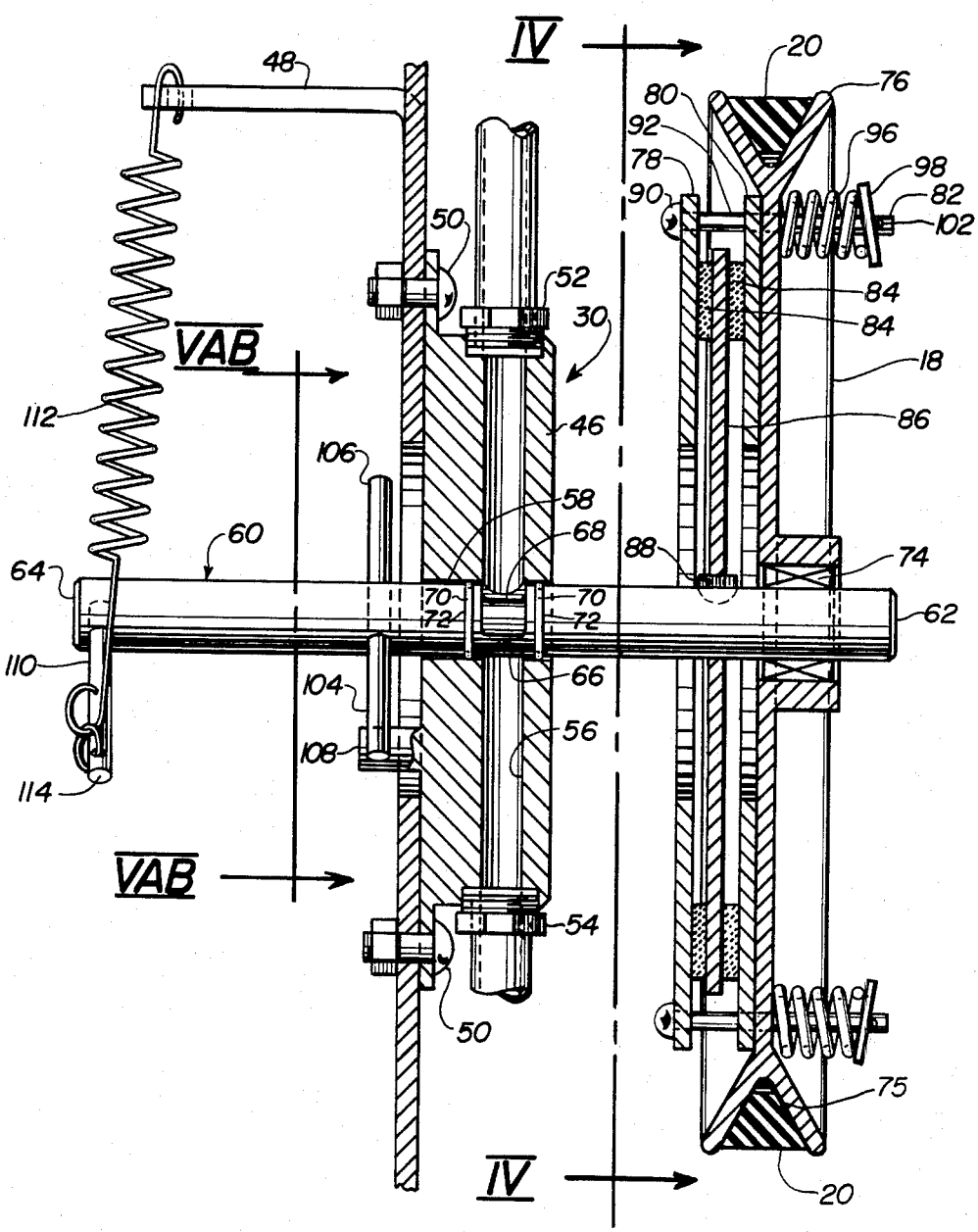
FIG. 3 is a cut-away side elevational view illustrating an embodiment of the apparatus of this invention.

Referring now to FIG. 3, bypass valve 30 includes a housing 46 of suitable steel secured to a frame portion 48 of grinder-mixer 10 by bolts or the like 50. Housing 46 includes an inlet 52, an outlet 54 and a fluid passageway 56 interconnecting inlet 52 and outlet 54. A bore 58 is formed through housing 46 transverse to and intersecting passageway 56. A shaft 60 extends through bore 58 and is rotatably mounted in housing 46. Shaft 60 includes a first end 62, a second end 64, each of the ends extending a substantial distance in opposite directions from housing 46. A portion of shaft 60 rotates in housing 46 and includes means 66 such as a shoulder for blocking fluid passage through passageway 56. A recess 68 is ground into shaft 60 for forming means for permitting fluid to pass around shaft 60 and through passageway 56. A pair of "O" rings 70 are preferably mounted in grooves 72 on opposite sides of shoulder 66 for limiting leakage of fluid from passageway 56.

Figure 4:
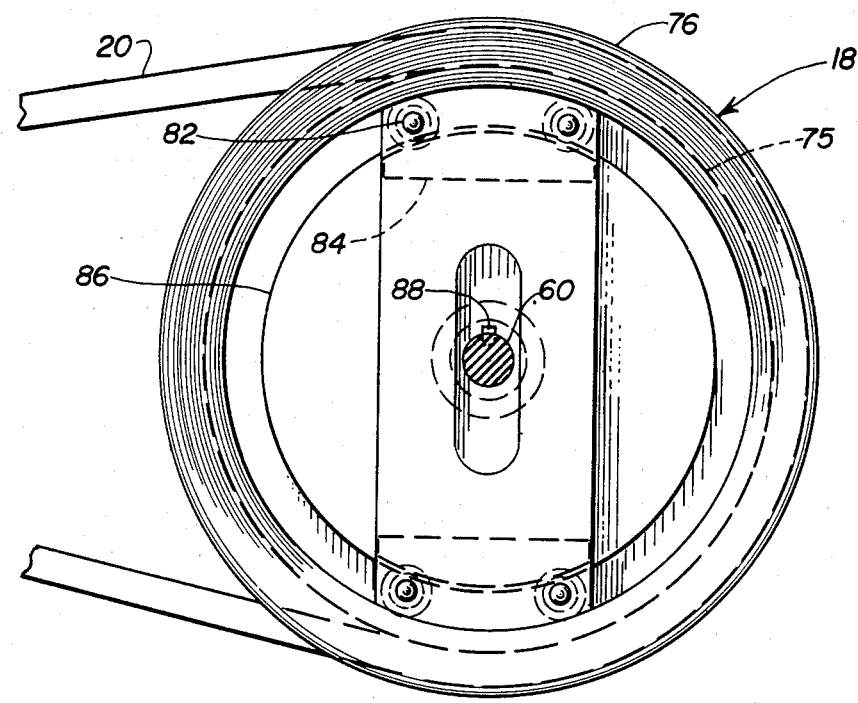
FIG. 4 is an end view taken along line IV—IV of FIG. 3.

In FIGS. 3, 4, driven sheave 18 is formed of a suitable steel and is mounted for rotation on shaft 60 by a journal bearing 74 adjacent first end 62. An arcuate periphery 76 of sheave 18 appears "V" shaped in cross-section to provide a suitable seat 75 for drive belt 20.

A pair of spaced steel plates 78,80 are interconnected with sheave 18 by a plurality of pins 82 for permitting plates 78,80 to rotate relative to shaft 60. Plates 78,80 include friction pads 84 mounted adjacent the plate outer periphery. Pads 84 are preferably formed of a known friction substance such as that used to form brake pads and the like. Pads 84 are attached to plates 78,80 preferably by riveting. Plates 78,80 are spaced by a steel friction disc 86 engaged by pads 84. Disc 86 is fixedly attached by a key 88 for rotating with shaft 60.

Pins 82 include a first end 90 engaged with plate 78. A shaft portion 92 of pins 82 extends through plates 78,80 and sheave 18. A second end extends a substantial distance from sheave 18. A suitable spring 96 is compressed between sheave 18 and a washer 98 secured adjacent second end by a cotter pin 102. In this manner, pads 84 are maintained in frictional engagement with disc 86.

Figure 5A:
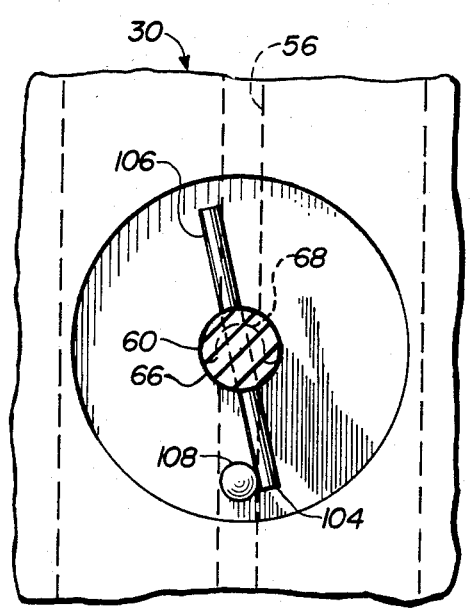
FIG. 5A is an end view taken along the line VAB—VAB of FIG. 3.

Means are provided for stopping rotation of shaft 60 in a fluid blocking position, see FIGS. 3 and 5A. Such means include stop member 104 extending transversely from shaft 60 for rotating with shaft 60. Means are provided for stopping rotation of shaft 60 in a fluid passing position, see FIGS. 3 and 5B. Such means includes stop member 106 extending transversely from shaft 60, opposite member 104. Also included is a stop peg 108 protruding from housing 46 and extending axially in the direction of shaft 60. Peg 108 extends a distance sufficient for engagement to stop rotation of members 104,106.

Figure 5B:
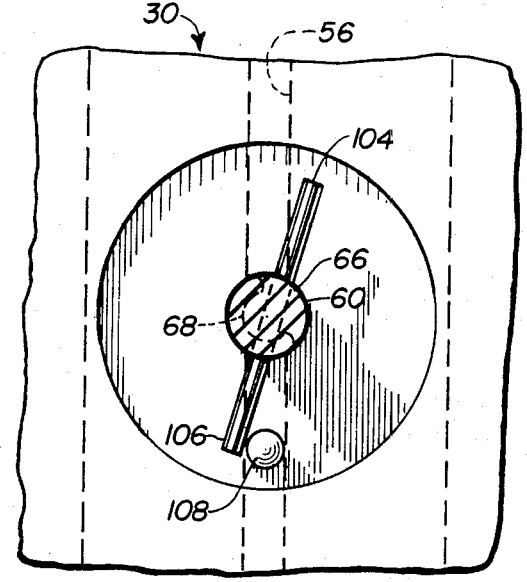
FIG. 5B is an end view taken along the line VAB—VAB of FIG. 3.

Means are provided for resiliently urging shaft 60 to a fluid passing position, see FIGS. 3 and 5B. Such means includes a member 110 extending transversely from second end 64 of shaft 60 and a suitable spring 112 interconnecting an end 114 of member 110 in tension with a frame portion 48. Spring 112 is sufficient to urge member 110 so as to rotate shaft 60 to a position where member 106 engages stop peg 108 when sheave 18 is not being driven by belt 20.

With the parts assembled as set forth above drive sheave 16 drives driven sheave 18 by means of belt 20. Springs 96 act on pins 82 to urge pads 84 into frictional engagement with disc 86. Since disc 86 is keyed to shaft 60 at key 88, rotation of sheave 18 results in rotation of shaft 60. However, shaft 60 only rotates until stop member 104 engages stop peg 108 thus stopping shaft 60 in a fluid blocking position in response to rotation of sheave 18. After stop member 104 and peg 108 are engaged, sheave 18 and plates 78,80 continue to be driven by belt 20 and rotate relative to shaft 60 and disc 86. Thus shaft 60 remains in a fluid blocking position as shown in FIG. 5A.

Should a lug down occur resulting in slowed rotation of drive sheave 16, centrifugal clutch 38 disengages drive sheave 16 resulting in drive sheave 16 and and driven sheave 18 being stopped from further rotation. In response, the tension exerted by spring 112 on member 110, is sufficient to urge shaft 60 to rotate to a fluid passing position wherein stop member 106 engages stop peg 108, see FIG. 5B.

The foregoing has described a hydraulic motor bypass apparatus suitable for automatically diverting fluid from a motor through a bypass valve thus retarding movement of a feed table associated with a grinder-mixer.

It is anticipated that aspects of the present invention other than those specifically defined in the appended claims, can be obtained from the foregoing description and the drawings.

Having thus described the invention, what is claimed is:

1. In combination with a feed device adapted to be driven by a fluid motor, apparatus comprising:
a rotatable shaft;
a driven member rotatably mounted on said shaft;
a pair of spaced plates connected to said driven member;
opposed friction pads mounted on said spaced plates;
means connected for rotating with said shaft, said means including a disc engaged between said pads;
means for urging said pads into engagement with said disc;
a valve in fluid communication with said fluid motor for permitting fluid to bypass said fluid motor, said valve having an inlet, an outlet and a fluid passageway interconnecting said inlet and outlet;
said shaft rotatably extending through said valve and said passageway;
means on said shaft for blocking fluid passage through said passageway to thereby close said valve and cause fluid to be directed to said fluid motor to drive said feed device.

2. The apparatus of claim 1 wherein the means for urging the pads includes a fastening member extending through said spaced plates and said driven member; and
a resilient member compressed between one end of said fastening means and said driven member.

3. The apparatus of claim 1 wherein said shaft is rotated to a fluid blocking position in response to rotation of said driven member.

4. The apparatus of claim 3 including:
means for stopping rotation of said shaft at said fluid blocking position, said means including a first stop member extending transversely from said shaft and including an associated stop peg connected for engaging said first stop member.

5. The apparatus of claim 4 including:
resilient means for urging said shaft to a fluid passing position in response to terminating rotation of said driven member; and
means for stopping rotation of said shaft at said fluid passing position, said means including a second stop member extending transversely from said shaft opposite said first stop member and including said stop peg.

6. In combination with a feed device adapted to be driven by a fluid motor, apparatus comprising:

a valve in fluid communication with said fluid motor for permitting fluid to bypass said fluid motor, said valve having an inlet, an outlet and a fluid passageway interconnecting said inlet and outlet;

a shaft rotatably extending through said valve and said passageway for movement between a fluid blocking position wherein said valve is closed so that fluid is directed to said fluid motor and a fluid passing position wherein said valve is opened so that fluid bypasses said fluid motor, said feed device being driven by said fluid motor when said shaft is in said fluid blocking position, and said feed device being stopped when said shaft is in said fluid passing position;

means for rotating said shaft to said fluid blocking position, said means including a driven member rotatably mounted on said shaft, a disc frictionally engaged between a pair of plates, said disc fixedly connected for rotating with said shaft, and means for interconnecting said driven member and said plates, said interconnecting means resiliently urged against said driven member for compressing said disc between said plates;

means for stopping rotation of said shaft in said fluid blocking position; and means for resiliently urging said shaft to rotate to said fluid passing position.

7. In a grinder-mixer, apparatus comprising:
a fluid circuit including a motor;
a feed table adapted to be driven by said motor;
a speed control valve fluidly connected to said motor;
a pump fluidly connected to said motor;

means connected for permitting fluid in said circuit to bypass said motor, said means including a valve having an inlet, an outlet and a fluid passageway interconnecting said inlet and outlet;

a shaft rotatably extending through said valve and said passageway for movement between a fluid blocking position wherein said valve is closed so that fluid is directed to said motor and a fluid passing position wherein said valve is opened so that fluid bypasses said motor, said feed table being driven by said motor when said shaft is in said fluid blocking position, and said feed table being stopped when said shaft is in said fluid passing position;

means for rotating said shaft to said fluid blocking position, said means including a drive member connected to a prime mover, a centrifugal clutch connected for starting and stopping rotation of said drive member, a driven member connected to said drive member, said driven member rotatably mounted on said shaft, a disc frictionally engaged between a pair of plates, said disc fixedly connected for rotating with said shaft, and means for interconnecting said driven member and said plates for compressing said disc between said plates;

means for stopping rotation of said shaft in said fluid blocking position in response to said disc being rotated; and means for resiliently urging said shaft to rotate to said fluid passing position in response to said centrifugal clutch stopping rotation of said drive member.

* * * * *